Feb. 13, 1951  M. U. SQUIERS  2,541,304
ANCHORING MEANS FOR VISORS FOR VEHICLES
Filed June 28, 1949
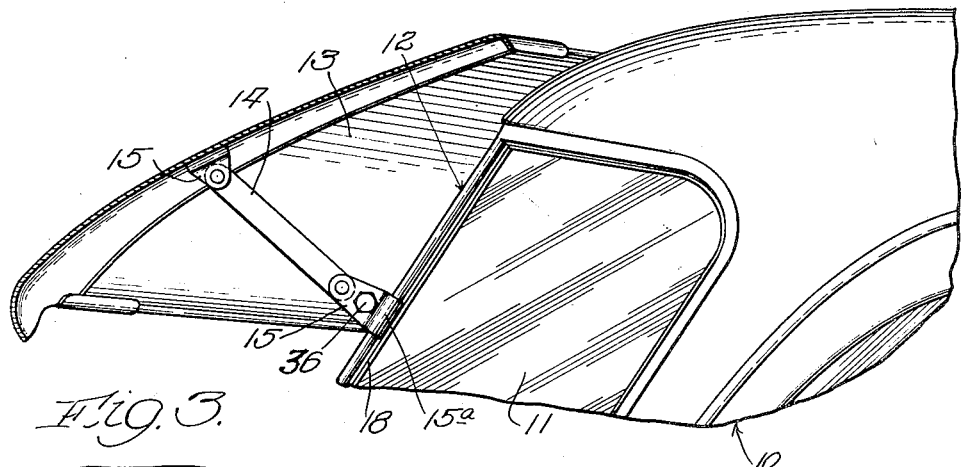
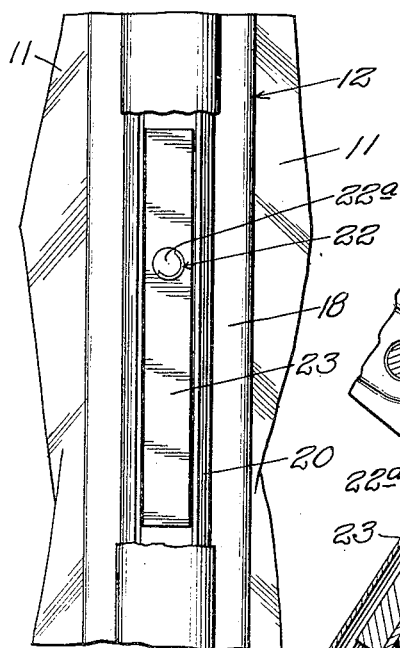
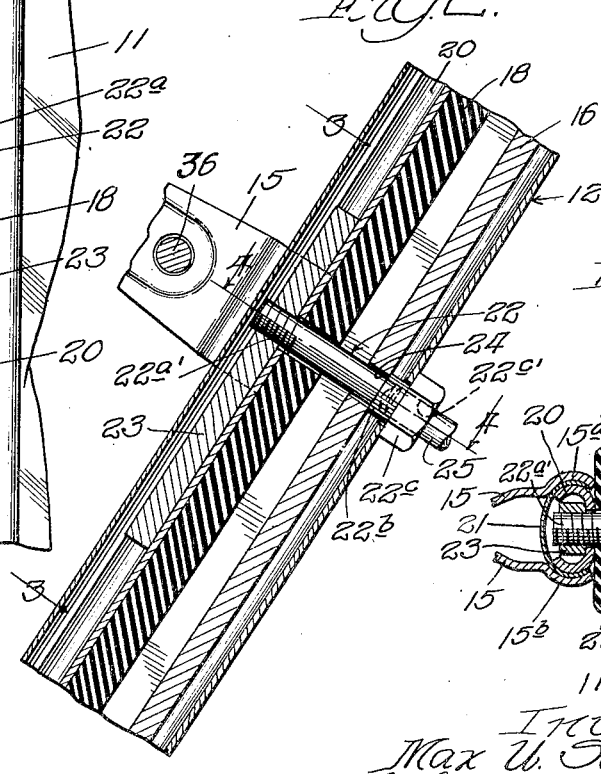
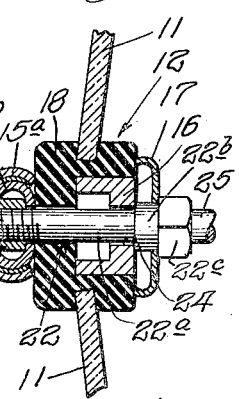
Inventor:
Max U. Squiers,
By Schroeder, Merriam,
Hofgren & Brady, Attys.

Patented Feb. 13, 1951

2,541,304

UNITED STATES PATENT OFFICE 2,541,304

ANCHORING MEANS FOR VISORS FOR VEHICLES

Max U. Squiers, La Grange, Ill., assignor to Charles Peckat Manufacturing Co., a corporation of Illinois Application June 28, 1949, Serial No. 101,872

2 Claims. (Cl. 296—95)

This invention relates to a demountable visor assembly for vehicles, and more particularly to anchoring means for a visor for a vehicle.

One feature of this invention is that it provides improved anchoring means for a visor for a vehicle; another feature of this invention is that it provides anchoring means comprising a bolt member extending through the dividing post of the windshield of the vehicle, the end of said bolt inside the vehicle being formed to support an accessory for the vehicle, as for example, a rear view mirror; a further feature of the invention is that the bolt cooperates with fastening means which engage a portion of the dividing post over a substantial area; and still another feature of the invention is that it provides anchoring means comprising a bolt having a shoulder for abutting the surface of the dividing bar inside the vehicle and having an enlarged head for engaging a trim strip inside the vehicle.

Other features and advantages will be apparent from the following specification and drawings, in which:

Fig. 1 is a fragmentary side elevational view of the upper front portion of an automobile having a demountable visor mounted thereon, and including the improved anchoring means, said visor being shown in section;

Fig. 2 is an enlarged fragmentary vertical section through the windshield dividing post of the vehicle of Fig. 1;

Fig. 3 is a section taken along the line 3—3 of Fig. 2, the exterior trim strip being shown partly broken away; and Fig. 4 is a transverse section along the line 4—4 of Fig. 2.

Many vehicles, particularly automobiles, are equipped with visors for protecting persons in the vehicle from the direct rays of the sun, and from glare. For a general description of such visors and their advantages, reference is had to Patent No. 2,180,909 issued November 21, 1939 to Charles Peckat, and to Patent No. 2,334,856 issued on November 23, 1943 to R. T. Atkinson. Such visors and certain features thereof are also disclosed in the co-pending application of Huntington R. Schlagel, filed October 25, 1947 as Ser. No. 782,074; the co-pending application of William A. Mueller and Walter Peckat filed January 22, 1947 as Ser. No. 723,594; in my co-pending application filed August 18, 1948 as Ser. No. 44,897; and in the co-pending application of Clarence R. Davis for a design patent, Ser. No. D. 149,696 filed November 18, 1948, now abandoned.

Such demountable visors preferably are secured to the automobile or other vehicle by a clamp and bracket connection between each end of the visor and the respective rain gutters on opposite sides of the vehicle, and by a clamp connection between the center portion of the visor and the outside of the windshield dividing post of the vehicle. This latter connection is important because, despite the fact that such visors generally terminate short of the top of the automobile so that there is an air space between the back side of the visor and the top of the automobile, at high speeds such great air forces are encountered that the visor may vibrate badly unless it is connected near its center to the vehicle.

Until recently the outside portion of the dividing post of the windshield of almost all automobiles was securely fastened from the outside of the vehicle to the inside portion of the dividing post, and this inside portion was an integral part of the body construction of the vehicle so that the center portion of the visor might be securely anchored by clamping it to the outer portion of the dividing post.

However, on certain recent model cars, while the inside portion of the dividing post (herein called the interior dividing bar) is still an integral part of the body construction, the exterior portion of the windshield post (herein referred to as the exterior holding strip) comprises a relatively light strip extending entirely around the periphery of each section of the windshield and mounted on the interior dividing bar in such manner that it may be pulled off by forces acting upon the visor when the vehicle travels at high speeds.

The present invention comprises a novel anchoring means which may be utilized for providing a firm center connection for the visor, the apparatus of the invention preferably having a shoulder adapted to abut the surface of the interior dividing bar on the inside of the vehicle and having an enlarged head adapted to abut an interior trim strip on the inside of the vehicle, said head being formed to support an accessory in the vehicle, as for example, a rear view mirror.

Referring now more particularly to the drawings, an automobile which is fragmentarily shown and generally designated as 10 has a windshield 11, formed in two portions separated by a center dividing post designated generally at 12. A visor 13 is supported on the vehicle, preferably having clamp and bracket connections between each end of the visor and the rain gutters of the automobile similar to the connections disclosed in the patent to Peckat noted above, and the center portion of the visor is connected to the dividing post of the windshield by means of a link 14 which is pivotally connected at one end to a bracket 15 depending from the under side of the visor near the center thereof, and which is pivotally connected at the other end to a clamping bracket 15 having clamping jaws 15a and 15b adapted to be closed in clamping relationship by means of a stud 36.

The dividing post 12 of the windshield comprises an interior dividing bar 16 which is of relatively heavy metal and is an integral part (at least operatively) of the body of the vehicle, forming a rigid structural support. On the inside of the vehicle an interior trim strip 17 is provided, this trim strip generally being held on to the interior dividing bar 16 by spring clip action or by small screws. Each section of the windshield 11 is carried in a rubber mounting 18 which extends around the entire edge of each section, and this rubber mounting being shown as U-shaped in transverse cross section to embrace the dividing bar 16, the mounting being held on the bar by means of an exterior holding strip 20 formed in transverse cross section as a channel, as may be seen in Fig. 4, and frictionally held to the body at the top and bottom of the strip 20. An exterior trim strip 21 of stainless steel or chrome is carried on the front of the holding strip 20, this trim strip being held on by spring action of the metal of which it is formed.

The holding strip 20, while it has sufficient strength to hold the windshield in place, does not have sufficient strength to anchor the visor, and if it were attempted to anchor the visor to this strip there would be great danger that vibration of the visor would pull the strip 20 away from its mounting on the dividing bar 16, loosening the visor and also loosening the windshield of the vehicle.

In order to provide a firm anchoring means for the visor at the dividing post 12, I provide a bolt member 22 which extends through the interior bar 16 and the exterior holding strip 20 and is fastened by a fastening member 23 which is adapted to engage the strip 20 and be fastened to the bolt 22 to secure the strip 20 firmly to the dividing bar 16 and provide a firm anchoring means to which the visor 13 may be clamped. The bolt 22 has a body portion 22a which is threaded at the outer end as shown at 22a'; a shank portion 22b forming a shoulder adapted to abut the surface of the interior of the dividing bar 16 on the inside of the vehicle; and an enlarged head portion 22c adapted to abut against the surface of the interior trim strip 17. With this construction, the bolt member 22 provides firm anchoring means, since force on the bolt is exerted against the rigid member 16. At the same time, the enlarged head portion provides a holding means for the interior trim strip 17 without exerting any force which might bend this trim strip. As an additional feature the enlarged head portion 22c is provided with a threaded opening 22c' (Fig. 2) which may receive the mounting stud 24 of a rear view mirror or other automobile accessory.

The fastening member 23 comprises an elongated steel bar having a threaded opening for receiving the complementary threaded end 22a' of the bolt member, as best seen in Figs. 2 and 3. The fastening member 23 is adapted to lie in the channel formed in the exterior holding strip 20, with the fastening member engaging the holding strip over a substantial area. This has two advantages, first in providing a substantial range over the length of the member 23 where the clamp 15 may be affixed and receive the full benefit of the anchoring device; and second, in strengthening the anchoring of the holding strip 20 over a substantial portion of its length.

In assembling a visor of the type illustrated, the exterior trim strip 21 is removed by snapping it off of the holding strip 20. The mounting stud of the rear view mirror may then be turned out of a threaded hole 24 which is provided in the dividing bar 16, and the hole 24 may be used as a pilot in drilling a hole through the rubber mounting 18 and the holding bracket 20. In some automobiles the lead-in wire from the radio antenna runs inside the dividing post of the windshield, and care should be taken in drilling this hole that this wire is not cut. When the hole has been drilled, the bolt 22 may be inserted and threaded into the fastening member 23, which is placed in the channel of the member 20 in the manner shown. The exterior trim strip 21 may now be replaced, and the visor may now be firmly anchored at its center portion by tightening the clamp 15 around the exterior trim strip 21 and the holding strip 20 as shown in Fig. 4. The mounting stud 25 of the rear view mirror may be threaded into the threaded opening in the end of the enlarged head 22c of the bolt member 22. With this construction the holding strip 21 is firmly anchored to the rigid dividing bar 16 at and adjacent the position of the clamp 15, and the visor is firmly anchored at its center.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a demountable visor assembly for vehicles having a windshield dividing post comprising an interior dividing bar and an exterior holding strip mounted thereon outside the windshield dividing post, apparatus of the character described for securing the holding strip to the dividing bar to provide anchoring means outside said windshield dividing post for said visor, comprising: a bolt member extending through said bar and strip, said member having a shoulder for abutting the surface of said bar inside the vehicle; and a fastening member adapted to engage said strip and be fastened to said bolt to secure said strip firmly to said dividing bar and provide anchoring means for center support means for the visor, said strip being formed with a channel and said fastening member comprising an elongated bar adapted to lie in said channel and engage said strip over a substantial area.

2. In a demountable visor assembly for vehicles having a windshield dividing post comprising an interior dividing bar and an exterior holding strip mounted thereon outside said windshield dividing post and formed with a channel, apparatus of the character described for securing the holding strip to the dividing bar to provide anchoring means outside said windshield dividing post for said visor, comprising: a bolt member extending through said bar and strip, said member having a shoulder for abutting the surface of said bar inside the vehicle and an enlarged head for engaging a trim strip inside the vehicle, and the head of said bolt member having a threaded opening therein to receive the mount for a rear view mirror; and a fastening member comprising an elongated steel bar adapted to lie in said channel and engage said holding strip over a substantial area, said steel bar having an opening threaded to receive the threaded end of said bolt to secure said holding strip firmly to said dividing bar and provide anchoring means for center support means for the visor.

MAX U. SQUIERS.

REFERENCES CITED

The following references are of record in the file of this patent:

UNITED STATES PATENTS

| Number | Name | Date |
|---|---|---|
| 2,226,522 | Myers | Dec. 24, 1940 |
| 2,252,716 | Levy | Aug. 19, 1941 |
| 2,334,856 | Atkinson | Nov. 23, 1943 |

FOREIGN PATENTS

| Number | Country | Date |
|---|---|---|
| 457,641 | Great Britain | Dec. 2, 1936 |